United States Patent
Dewald et al.

(10) Patent No.: US 8,343,370 B2
(45) Date of Patent: Jan. 1, 2013

(54) METHOD OF FABRICATING A PTFE SEAL ELEMENT AND A SHAFT SEAL ASSEMBLY THEREWITH

(75) Inventors: Richard E. Dewald, Clinton, MI (US); Bhawani S. Tripathy, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 336 days.

(21) Appl. No.: 12/388,949

(22) Filed: Feb. 19, 2009

(65) Prior Publication Data

US 2010/0206844 A1  Aug. 19, 2010

(51) Int. Cl.
*B44C 1/22* (2006.01)

(52) U.S. Cl. .......... 216/57; 277/560; 277/152; 277/134; 428/421

(58) Field of Classification Search .................. None
See application file for complete search history.

(56) References Cited

U.S. PATENT DOCUMENTS

| | | | | |
|---|---|---|---|---|
| 4,243,235 | A | * | 1/1981 | Repella .......................... 277/560 |
| 4,312,693 | A | | 1/1982 | Salensky et al. |
| 4,603,712 | A | * | 8/1986 | Krause .......................... 138/137 |
| 4,613,143 | A | | 9/1986 | Butler |
| 4,670,089 | A | * | 6/1987 | Hanson .......................... 216/35 |
| 4,822,058 | A | * | 4/1989 | Butler et al. ................... 277/559 |
| 4,986,553 | A | | 1/1991 | Preston |
| 4,987,004 | A | * | 1/1991 | Yamazaki et al. ............. 427/577 |
| 5,009,742 | A | * | 4/1991 | Saxod et al. .................... 216/34 |
| 6,057,414 | A | | 5/2000 | Razavi |
| 6,264,369 | B1 | | 7/2001 | Mesing et al. |
| 6,293,312 | B1 | * | 9/2001 | Stripe ........................... 138/141 |
| 6,299,787 | B1 | * | 10/2001 | Li et al. .......................... 216/34 |
| 6,451,396 | B1 | | 9/2002 | Zumbrum et al. |
| 6,543,785 | B1 | | 4/2003 | Katayama et al. |

(Continued)

FOREIGN PATENT DOCUMENTS

JP 2004-308906 A 11/2004

OTHER PUBLICATIONS

Sung R. Kim, Surface Modification of Poly(tetrafluoroethylene) Film by Chemical Etching, Plasma, and Ion Beam Treatments, 2000, Journal of Applied Polymer Science, vol. 77, p. 1913-1920.*

(Continued)

*Primary Examiner* — Binh X Tran
*Assistant Examiner* — David Cathey, Jr.
(74) *Attorney, Agent, or Firm* — Robert L. Stearns; Dickinson Wright, PLLC

(57) ABSTRACT

A method of fabricating a PTFE seal element and rotary shaft seal assembly therewith. The method includes providing a PTFE seal element and a vacuum chamber having electrodes therein. Next, placing the PTFE seal element on one electrode and drawing a vacuum pressure in the chamber and introducing a first process gas into the chamber. Further, applying a high frequency signal to the electrodes and producing a discharge plasma and etching and chemically modifying a surface of the PTFE seal element with the discharge plasma. Then, purging the vacuum chamber with a second process gas and restoring the vacuum chamber to an atmospheric pressure. Thereafter, rinsing the seal element and applying an adhesion promoter to the etched and chemically modified surface. Lastly, attaching the etched and chemically modified surface of the PTFE seal element to the carrier by molding an elastomeric material between the seal element and the carrier.

11 Claims, 2 Drawing Sheets

U.S. PATENT DOCUMENTS

| | | |
|---|---|---|
| 6,673,455 B2 | 1/2004 | Zumbrum et al. |
| 6,915,574 B2 | 7/2005 | Mesing et al. |
| 7,044,475 B2 | 5/2006 | Imai et al. |
| 7,134,669 B2 | 11/2006 | Uhrner |
| 7,135,122 B2 | 11/2006 | Park |
| 2001/0013504 A1 | 8/2001 | Imafuku |
| 2004/0032093 A1 | 2/2004 | Razavi |
| 2004/0227304 A1 | 11/2004 | Kern et al. |
| 2006/0000801 A1 | 1/2006 | Park |
| 2006/0003126 A1 | 1/2006 | Park et al. |
| 2006/0003127 A1 | 1/2006 | Park et al. |
| 2006/0004117 A1 | 1/2006 | Park |
| 2006/0004142 A1 | 1/2006 | Park et al. |
| 2006/0004147 A1 | 1/2006 | Park et al. |
| 2006/0006606 A1 | 1/2006 | Smith et al. |
| 2007/0036980 A1 | 2/2007 | Park |
| 2007/0044906 A1 | 3/2007 | Park |
| 2007/0048476 A1 | 3/2007 | Park |
| 2008/0057247 A1* | 3/2008 | DiMascio .................. 428/36.91 |

OTHER PUBLICATIONS

Roger Robbins, March Asher Operation, Jul. 31, 2006, The University of Texas at Dallas, Document No. SU2006-TF-001, p. 1-13.*

G. Van Gool, Bonding of Fluoroelastomers to Various Substrates, 1998, Rubber Bonding Conference, ISBN:1-85957-151-4, paper 15, p. 7.*

* cited by examiner

METHOD OF FABRICATING A PTFE SEAL ELEMENT AND A SHAFT SEAL ASSEMBLY THEREWITH

BACKGROUND OF THE INVENTION

1. Technical Field

This invention relates generally to rotary shaft seals, and more particularly to methods of fabricating PTFE seal elements and a rotary shaft seal assembly having a PTFE seal element.

2. Related Art

Rotary shaft seal assemblies are known to incorporate PTFE seal elements for establishing a low friction seal relative to a rotating shaft. An understood challenge in manufacturing these seal assemblies is establishing a reliable bond between the PTFE seal element and the adjoining substrate of the seal assembly. The properties of PTFE, being lubricious, typically makes it difficult to form a reliable bond between it and the adjoining substrate. In one known method of fabricating a PTFE seal assembly, a PTFE seal element is first machined from a PTFE billet, and then the PTFE seal element is further processed in a secondary operation using a "wet-chemistry" process to etch and chemically modify a surface of the PTFE seal element. The chemically modified PTFE element is then molded to a substrate of the seal assembly. Although this process can prove effective in attaining a bond between the PTFE element and the adjoining seal assembly substrate, it is potentially hazardous given the wet-chemistry process used to chemically modify the PTFE element. In addition to the wet-chemistry process being potentially hazardous, it is not a practiced by many suppliers, and thus, the number of potential sources capable of performing the process is limited. As such, with the wet-chemistry process being potentially hazardous and offered by limited suppliers, the costs associated with this process are typically high. Accordingly, the total manufacturing cost of the PTFE seal assembly is increased.

SUMMARY OF THE INVENTION

According to one presently preferred aspect of the invention, a method of fabricating a PTFE seal element of a rotary shaft seal assembly is provided. The method includes providing a PTFE seal element; providing a vacuum chamber having electrodes therein, and placing one surface of the PTFE seal element on one of the electrodes. Then, drawing a vacuum pressure in the vacuum chamber and introducing a first selected process gas into the vacuum chamber. Further, applying a high frequency signal to the electrodes for a predetermined period of time and producing a discharge plasma from the process gas between the electrodes, with the discharge plasma etching and chemically modifying at least a portion of the one surface of the PTFE seal element contacting the electrode. Then, purging the vacuum chamber with a second selected process gas and restoring the vacuum chamber to an atmospheric pressure. Thereafter, rinsing the one surface of the seal element in a rinse solution and applying an adhesion promoter to the rinsed surface.

Accordingly to another aspect of the invention, a method of fabricating a rotary shaft seal assembly is provided. The method includes providing a rigid annular carrier, a PTFE seal element having opposite first and second surfaces and a vacuum chamber having electrodes therein. Next, placing the first surface of the PTFE seal element on one of the electrodes; drawing a vacuum pressure in the vacuum chamber and introducing a first selected process gas into the vacuum chamber. Further, applying a high frequency signal to the electrodes for a predetermined period of time and producing a discharge plasma from the process gas between the electrodes, with the discharge plasma etching and chemically modifying at least a portion of the second surface of the PTFE seal element facing away from the first surface. Then, purging the vacuum chamber with a second selected process gas and restoring the vacuum chamber to an atmospheric pressure. Thereafter, rinsing the second surface of the seal element in a rinse solution and applying an adhesion promoter to the rinsed surface. Lastly, attaching the rinsed surface to the carrier by molding an elastomer between the carrier and the rinsed surface.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
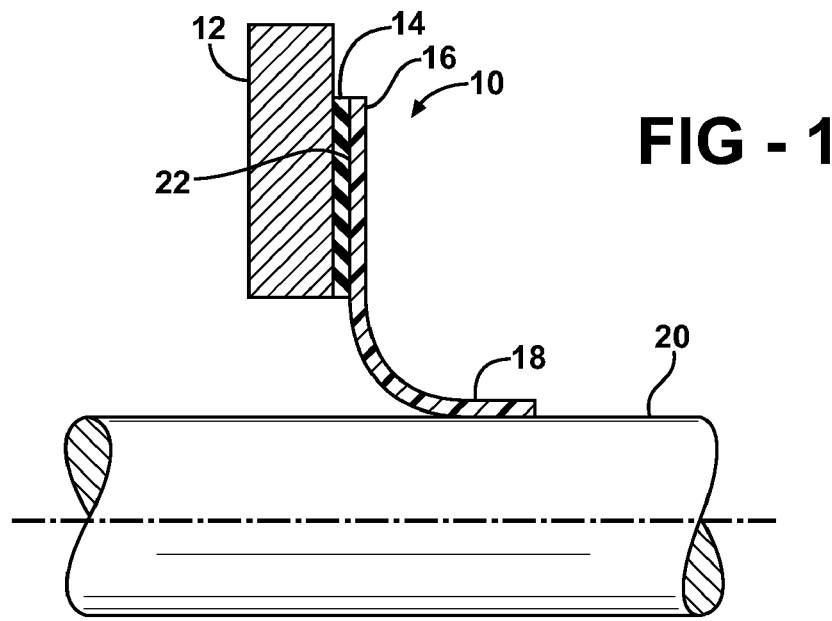
FIG. 1 is a partial cross-sectional view of a rotary shaft seal assembly constructed in accordance with one presently preferred aspect of the invention.

Referring in more detail to the drawings, FIG. 1 illustrates a rotary shaft seal assembly 10 constructed in accordance with one presently preferred aspect of the invention. The assembly 10 has a rigid annular carrier 12, preferably manufactured from metal, e.g. steel, configured for attachment to a machine component, such as a bearing ring or housing (not shown), for example. It is to be understood that the carrier 12 can be configured in any suitable manner. The assembly 10 further has an annular elastomer 14 attached thereto, such as in a molding process or by way of a suitable adhesive, and an annular PTFE seal element 16 attached to the elastomer 14. The PTFE seal element 16 extends radially inwardly from the carrier 12 to provide a seal lip 18 for dynamic sealing engagement with a shaft 20 rotating relative to the seal element 16.

Figure 3:
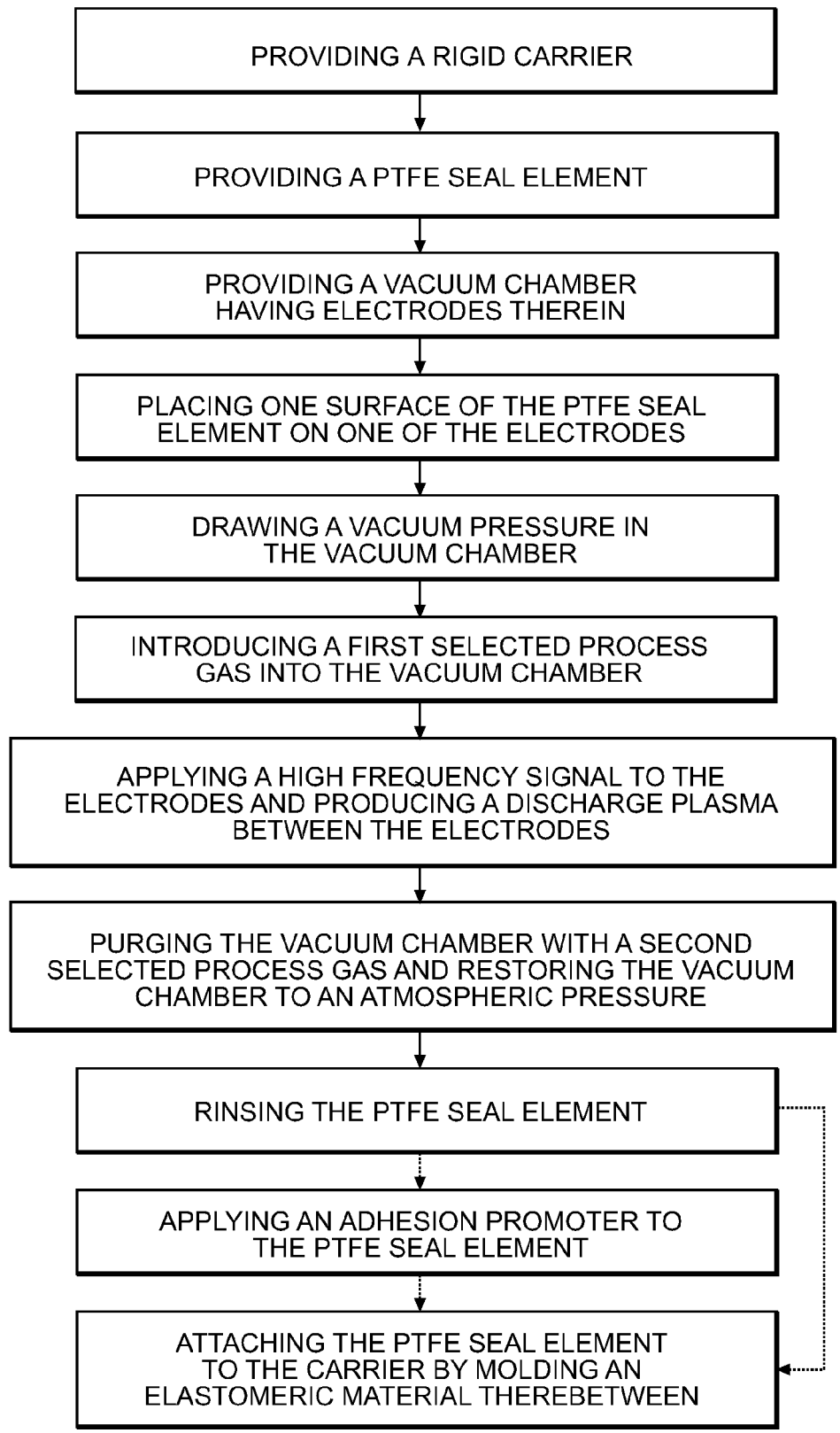
FIG. 3 is a process flow diagram according to one presently preferred aspect of the invention.

In accordance with one aspect of the invention, and as diagrammed in FIG. 3, the PTFE seal element 16 is constructed by cutting a desired width disc from a PTFE billet, such as a tubular billet of desired diameter. The cutting operation can be performed using any suitable cutting mechanism. As such, the disc preferably takes on the general size and shape of the finished seal element 16 upon being cut. As such, for the seal element 16, the disc is generally a symmetrical annular disc having opposite flat sides facing away from one another. It should be understood that the disc can be formed having any desired size and shape.

Then the PTFE disc or discs are further processed by placing them into a suitably sized vacuum chamber. The vacuum chamber has a pair or pairs of electrodes spaced from one another, wherein one of the electrodes is preferably provided as a support or carrier upon which the discs are placed. The supporting electrode can be constructed as a mesh of metal wire, e.g. screen. The size of the mesh can be varied as desired to provide the properties to the electrode. The disc, if symmetrical, can be placed with either of its surfaces or sides engaging the supporting electrode, and if non-symmetrical, can be placed with the desired surface or side engaging the supporting electrode.

Upon placing the discs of PTFE onto the supporting electrode within the vacuum chamber, the process continues by drawing a vacuum pressure within the vacuum chamber. The vacuum pressure is preferably drawn to about 1 mbar.

Figure 2:
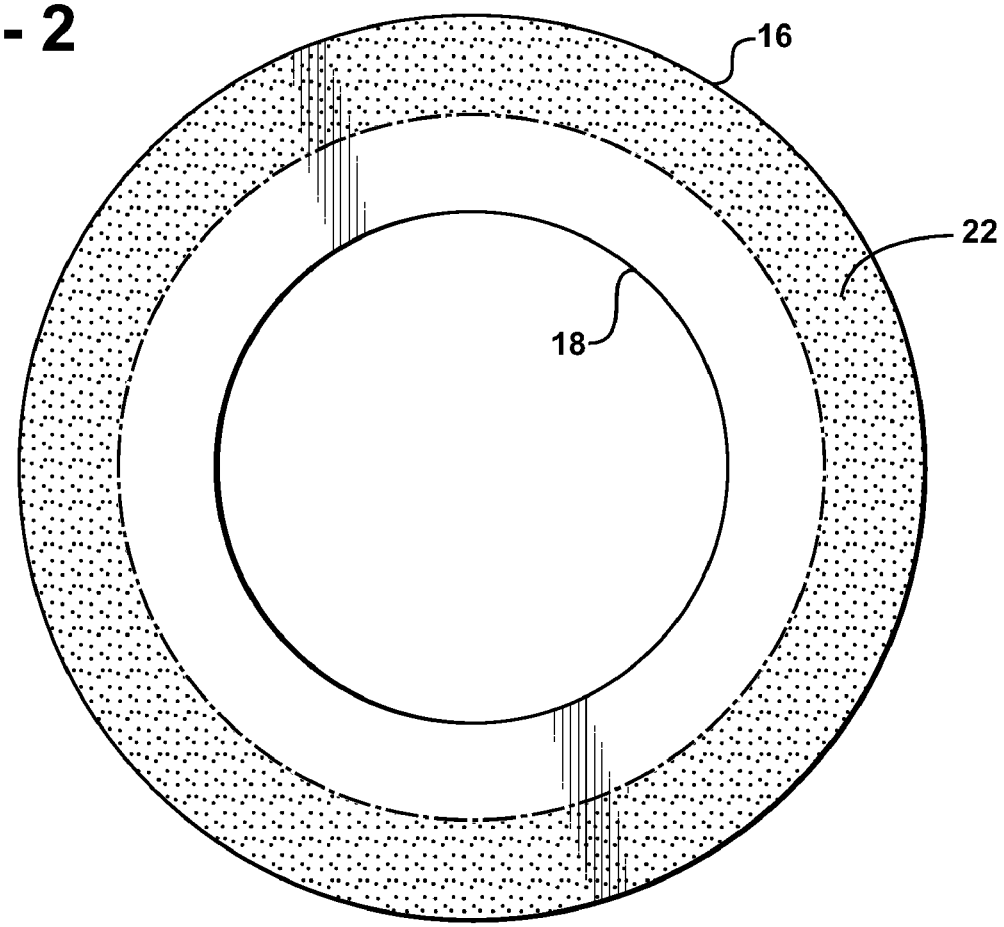
FIG. 2 is a plan view of a PTFE seal element of the seal assembly of FIG. 1.

Next, the process continues by introducing a first selected process gas into the vacuum chamber, such as hydrogen, oxygen, argon, ammonia, helium, nitrogen or water vapor. Upon the first process gas being introduced into the chamber, the process continues by applying a high frequency signal, such as about 40 kHz, 13.56 MHz, or 2.45 GHz, for example, to the electrodes for a predetermined period of time and producing a discharge plasma from the process gas between the electrodes. The high frequency signal is preferably applied for about 10 to 60 minutes, though the time period could be different depending on the size of the PTFE disc and the etching and chemical modification of the surface desired. The discharge plasma alters the surface of the PTFE disc by etching and chemically modifying the portion of the PTFE disc exposed to the plasma, such as shown generally at 22 in FIGS. 1 and 2. As such, the portion of the PTFE disc in contact with the wire mesh, or first side of the disc, is not etched to the extent that the opposite second side is etched, but the etching is sufficient for the application.

The next step in the process includes purging the vacuum chamber with a second selected process gas, such as nitrogen, and restoring the vacuum chamber to an atmospheric pressure.

Upon the vacuum chamber being purged, the process then involves rinsing the etched and chemically modified surface of the disc. The rinsing can be performed in a bath or spraying process, with the rinsing solution being provided as a mild acid solution such as dilute acetic acid.

After the rinsing step, the process preferably includes applying an adhesion promoter to the etched and chemically modified surface. The adhesion promoter can be provided as a silane or phenolic adhesive. The adhesion promoter can be applied in a spraying process or any other suitable process.

Lastly, the seal element is attached to the carrier. The seal element is oriented with the preferentially etched and chemically modified surface facing the carrier and an elastomer is then molded between the carrier and etched and chemically modified surface of the seal element. The molding process includes typical molding processes used in molding elastomers, such as an injection molding process, for example. Accordingly, the attaching process that attaches the seal element to the carrier does not require use of caustic chemicals or other potentially harmful process.

Obviously, many modifications and variations of the present invention are possible in light of the above teachings. It is, therefore, to be understood that within the scope of the appended claims, the invention may be practiced otherwise than as specifically described.

What is claimed is:

1. A method of fabricating a rotary shaft seal assembly, comprising:
    providing a rigid annular carrier;
    providing an annular PTFE seal element having opposite, planar first and second surfaces;
    providing a vacuum chamber having electrodes therein;
    placing the first surface of the PTFE seal element on one of the electrodes;
    drawing a vacuum pressure in the vacuum chamber;
    introducing a first selected process gas into the vacuum chamber;
    applying a high frequency signal to the electrodes for a predetermined period of time and producing a discharge plasma from the process gas between the electrodes, the discharge plasma etching and chemically modifying at least a portion of the second surface of the PTFE seal element;
    purging the vacuum chamber with a second selected process gas and restoring the vacuum chamber to an atmospheric pressure;
    rinsing the second surface using an acidic solution after the step of etching and chemically modifying at least a portion of the second surface by the discharge plasma absent an intermediate wet chemical etching step between the plasma etching and the rinsing using acidic solution;
    applying an adhesion promoter to the second surface after the step of rinsing; and
    attaching the second surface to the carrier after the step of applying the adhesion promoter by molding an elastomer between the second surface and the carrier.

2. The method of claim 1 further including using a phenolic adhesive for the adhesion promoter.

3. The method of claim 1 further including providing the second selected process gas as nitrogen.

4. The method of claim 1 further including using silane for the adhesion promoter.

5. The method of claim 1 further including providing the first selected process gas from the group consisting of hydrogen, oxygen, argon, ammonia, helium, nitrogen and water vapor.

6. The method of claim 5 further including providing the second selected process gas as nitrogen.

7. The method of claim 1 further including using a wire mesh tray as said one of the electrodes.

8. The method of claim 1 further including applying the high frequency signal to the electrodes for about 10 to 60 minutes.

9. The method of claim 1 wherein the rotary shaft seal assembly is fabricated absent any wet chemical etching process.

10. A method of fabricating a rotary shaft seal assembly, comprising the steps of:
    providing a rigid annular carrier;
    providing an annular PTFE seal element having opposite, planar first and second surfaces;
    providing a vacuum chamber having electrodes therein;
    placing the first surface of the PTFE seal element on one of the electrodes;
    drawing a vacuum pressure in the vacuum chamber;
    introducing a first selected process gas into the vacuum chamber;
    applying a high frequency signal to the electrodes for a predetermined period of time and producing a discharge plasma from the process gas between the electrodes, the discharge plasma etching and chemically modifying at least a portion of the second surface of the PTFE seal element,
    purging the vacuum chamber with a second selected process gas and restoring the vacuum chamber to an atmospheric pressure;
    rinsing the second surface using an acidic solution immediately after the step of etching and chemically modifying at least a portion of the second surface by the discharge plasma;

applying an adhesion promoter to the second surface after the step of rinsing; and attaching the second surface to the carrier after the step of applying the adhesion promoter by molding an elastomer between the second surface and the carrier.

11. The method of claim 10 wherein the rotary shaft seal assembly is fabricated absent any wet chemical etching process.

* * * * *